Patented June 6, 1950

2,510,893

UNITED STATES PATENT OFFICE 2,510,893

PRODUCTION OF ORGANO-THIYL COMPOUNDS

Morton Kleiman, Chicago, Ill., assignor to Velsicol Corporation, Chicago, Ill., a corporation of Illinois No Drawing. Application December 20, 1946,
Serial No. 717,595

9 Claims. (Cl. 260—608)

This invention relates to organo-thiyl compounds, such as organic disulfides and mercaptans, and to a process for producing the same. More particularly, my invention relates to new classes of organic disulfides and new compositions of matter, as well as to methods whereby these and related known materials may be prepared.

One object of this invention is to provide a new process for preparing symmetrical and unsymmetrical organic disulfides. A symmetrical disulfide is herein defined as a compound of the general formula RSSR, wherein R represents any organic radical. An unsymmetrical organic disulfide is herein defined as a compound of the general formula RSSR', wherein R and R' represent two different organic radicals.

Another object of this invention is the preparation of organic disulfides hitherto unknown and/or believed to be impossible of existence.

Another object of this invention is to provide a new and simplified process for producing organic disulfides which have heretofore been prepared only with great difficulty by previously known methods.

Another object relates to the production and recovery of mercaptans.

Other objects and advantages will become apparent hereinafter.

Heretofore, only a few unsymmetrical organic disulfides have been synthesized. These have included a number of variously substituted diaryl disulfides and aryl alkyl disulfides. The methods involved in the preparation of these compounds have all been severely limited, painstaking, and costly, and therefore generally unsuited to industrial practice. Furthermore, owing to the extremely limited utility of these methods, it has never before been possible to synthesize most of the vast number of unsymmetrical disulfides theoretically capable of existence. Thus, no successful synthesis of any of the following types of unsymmetrical disulfides has heretofore been recorded:

1. Di-aliphatic and substituted di-aliphatic disulfides, such as, for example, methyl n-amyl disulfide, methyl beta-hydroxyethyl disulfide, or ethyl beta-chloroethyl disulfide.

2. Aliphatic alicyclic and substituted aliphatic alicyclic disulfides, such as, for example, ethyl cyclohexyl disulfide or ethyl 4-chlorocyclohexyl disulfide.

3. Substituted aliphatic aromatic disulfides, such as, for example, beta-hydroxyethyl phenyl disulfide, methyl 4-chlorophenyl disulfide, or isopropyl 3-nitrophenyl disulfide.

4. Aliphatic heterocyclic and substituted aliphatic heterocyclic disulfides, such as, for example, methyl 2-benzothiazyl disulfides, ethyl 2-thienyl disulfide, or methyl 2-pyridyl disulfide.

5. Di-alicyclic and substituted di-alicyclic disulfides, such as, for example, cyclopropyl cyclihexyl disulfide, or 4-bromocyclohexyl disulfide.

6. Alicyclic aromatic and substituted alicyclic aromatic disulfides, such as, for example, cyclohexyl napthyl disulfide, cyclopentyl phenyl disulfide, or cyclopentyl 2-chlorophenyl disulfide.

7. Alicyclic heterocyclic and substituted alicyclic heterocyclic disulfides, such as, for example, cyclohexyl 4-pyridyl disulfide or cyclopentyl 2-benzothiazyl disulfide.

8. Aromatic heterocyclic and substituted aromatic heterocyclic disulfides, such as, for example, phenyl 2-thienyl disulfide or 4-nitrophenyl 2-pyrryl disulfide.

9. Di-heterocyclic and substituted di-heterocyclic disulfides, such as, for example, 4-pyridyl 2-benzothiazyl disulfide or 4-(2-chloropyridyl) 2-benzothiazyl disulfide.

Compounds belonging to any of the above classes may now be prepared simply, and in good yield by the process embodied in the present invention.

Broadly stated, my invention comprises providing an appropriate reaction mixture in which all the groups desired are present (but obviously not in the same combination as that of the finally desired compound or compounds) and effecting the redistribution of these groups by appropriate means, as described hereinafter.

Thus, in one specific embodiment, my invention relates to a method of synthesizing organic disulfides by effecting a redistribution of organothiyl groups, as described hereinafter, within a reaction mixture of organic disulfides wherein the organo-thiyl groups of the reactants are in combination different from that of the desired reaction product. The reaction mixture may be composed of different symmetrical organic disulfides, different unsymmetrical organic disulfides, or a mixture of symmetrical and unsymmetrical organic disulfides. For example, an unsymmetrical organic disulfide may be synthesized by subjecting to appropriate redistribution conditions a reaction mixture comprising two symmetrical organic disulfides.

In another specific embodiment, my invention relates to a method of synthesizing organic disulfides, either symmetrical or unsymmetrical, by effecting a redistribution of organo-thiyl groups, as described hereinafter, within a reaction mixture of an organic disulfide and a mercaptan wherein the organo-thiyl groups of the reactants are in combination different from that of the desired reaction product. The organic disulfide of the reaction mixture may be unsymmetrical or symmetrical. In the latter case the RS-group of the mercaptan should be different from those present in the symmetrical organic disulfide. In this embodiment mercaptans may be recovered as a product or by-product of the process.

In still another specific embodiment, my invention relates to the synthesis of symmetrical organic disulfides by effecting, as described hereinafter, a redistribution of the organo-thiyl groups of unsymmetrical organic disulfides.

The following are illustrative of some of the reactions which occur:

1. $RSSR + R'SSR' \rightleftarrows 2RSSR'$
2. $RSSR + R'SH \rightleftarrows RSSR' + RSH$
3. $RSSR + 2R'SH \rightleftarrows R'SSR' + 2RSH$ Thus, in accordance with Equation 1, any particular unsymmetrical disulfide, RSSR', may be obtained by appropriate treatment, as described hereinafter, of a mixture of the two symmetrical disulfides, RSSR, and R'SSR'. Conversely, unsymmetrical disulfides may be similarly converted and by subsequent suitable fractionation or other ordinary purification procedure separated into each of the symmetrical disulfides corresponding to the various RS-groups originally present.

In accordance with Equation 2, any particular unsymmetrical disulfide, RSSR', may be obtained by analogous treatment of an approximately equimolar mixture of a symmetrical disulfide, RSSR, and a mercaptan, R'SH.

In accordance with Equation 3, a symmetrical disulfide, R'SSR', may be obtained by reacting two or more mols of its corresponding thiol compound, R'SH, with approximately one mol of a different, symmetrical disulfide, RSSR. It is obvious that this same reaction may be utilized as well for producing mercaptans. A special case of this reaction is the catalyzed reduction of a disulfide by hydrogen sulfide; this reagent may be regarded as a mercaptan, reacting in accordance with the same general scheme, as follows:

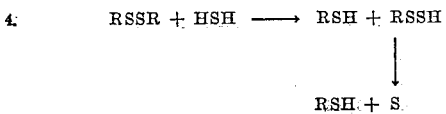

The end result being:

5. $RSSR + H_2S \rightarrow 2RSH + S$

For carrying out the redistribution reactions, described above in accordance with the present invention, certain catalytic agents are employed, which comprise the alkali-metal mercaptides and substances which can form alkali-metal mercaptides under the conditions of reaction.

In general, the alkali-metal mercaptide which is employed in carrying out the processes of this invention corresponds to the organo-thiyl group of a reactant; however, a mixture of alkali-metal mercaptides may also be used. For example in a reaction mixture of methyl disulfide and isoamyl mercaptan, the catalyst may comprise sodium methyl mercaptide, sodium isoamyl mercaptide, or a mixture of these two alkali-metal mercaptides. Any other alkali-metal mercaptide will also serve as a catalyst, such as, for example, potassium methyl mercaptide, potassium isoamyl mercaptide, lithium methyl mercaptide, lithium isoamyl mercaptide, et cetera. Moreover, while it is convenient to use a mercaptide corresponding to the organo-thiyl groups of the reactants, this is not a necessary condition. Other mercaptides will function as catalysts in the same manner; for example, lithium phenyl mercaptide, sodium ethyl mercaptide, potassium cyclohexyl mercaptide, and any other alkali-metal mercaptides will satisfactorily serve the purpose.

The catalyst may be prepared separately and added to the reaction mixture, or it may be generated very conveniently, directly in situ, by the use of a number of catalyst precursors. For example, in a reaction mixture of phenyl disulfide and cyclohexyl disulfide, the catalyst (comprising a mixture of alkali-metal mercaptides) may be prepared directly within the reaction mixture by adding an alkali-metal and an alcohol, such as sodium and methanol, potassium and butanol, lithium and octanol; the catalyst may also be made by adding an alkali-metal and a mercaptan such as propyl mercaptan, thiophenol, and others. Another method of forming the catalyst is the addition to the reaction mixture of a few milliliters of a saturated alcoholic solution of an alkali-metal sulfide, such as sodium sulfide and potassium sulfide. The latter react with the disulfide to produce the alkali-metal mercaptide. Other catalyst precursors include the alkali-metal hydrosulfites (hyposulfites), alkali-metal hydroxides in the presence of a mercaptan, organo-metallic compounds such as phenyl lithium or n-butyl sodium, and others.

These catalyzed reactions of the present invention are generally performed in non-aqueous, liquid systems at temperatures from about 20° C. to about 225° C. for a period of from about one to about twenty-four hours. These limits of temperature and time are not critical, but represent rather, the optimum working range. Thus, at temperatures much below 20° C., these reactions become very slow and require an unduly extended reaction period, while at temperatures much above 225° C., the advantages of greater reaction velocities are offset by the disadvantage of causing some decomposition of the reactants. In some instances, it may also be necessary when using higher temperatures, to provide sufficient pressure to confine the reactants to the reaction vessel and to retain them in the liquid state.

Occasionally it is more convenient or advantageous to operate in an aqueous system. This is the case, for example, when dealing with a reaction mixture containing a water-soluble reactant and a water-insoluble reactant. By performing the reaction in the presence of water, it often becomes possible to facilitate the removal of the excess or unreacted portion of the soluble components without recourse to fractional distillation, simply by separation of the aqueous phase. The possibility of these or other advantages of operating in an aqueous system may be readily determined by simple experiments.

In most instances, the mixture of reactants is simply heated for about one hour (or even less, such as about one-half hour, but with lower yields) at a temperature between 80° C. and 100° C. with a minute quantity of catalyst. The separation of the reaction product is then effected by usual methods, such as fractional distillation, crystallization, etc. Often it is not necessary to remove the catalyst prior to the separation of the product by distillation or crystallization. In general, however, it is desirable that the catalyst be removed so that a new and unfavorable equilibrium is not established. In the conversion of an unsymmetrical disulfide to its symmetrical parent compounds and the separation of the latter by fraction distillation, however, the presence of a catalyst may be desirable throughout the operation.

There are many important uses in industry and the arts for organic disulfides and mercaptans prepared in accordance with my invention, including both those previously known but which may now be prepared more simply and cheaply by the processes of my invention, and those which have not previously been known and which may now be prepared for the first time by the methods herein disclosed. Especially prominent among the many industrial applications of these known compounds is their utilization as modifiers, stabilizers, accelerators, anti-oxidants and vulcanizing agents in the manufacture of synthetic and natural rubber products. Among the large number of such compounds which are useful for these applications, the following may be mentioned as typical: Alpha- and beta-naphthyl mercaptans, o- and p-mercaptobiphenyls, diisopropyl dixanthogen, tolyl disulfide, alkyl phenol disulfides, 2-methylbutyl disulfide, 3-methylpentyl disulfide, 2-ethylhexyl disulfide, 2-mercaptobenzothiazole, 2-mercaptobenzooxasole, 2-mercapto-4-alkyl or aryl-thiazole, thioglycollic acid, thiolactic acid, beta-mercaptoethanol, dithiodiglycollic acid, bis-(beta-hydroxyethyl) disulfide, and bis-(beta-amino-ethyl) disulfide.

Organic disulfides such as butyl disulfide, whose preparation from butyl mercaptan is described in Example I, are excellent solvents for rubber, resins, and plastics, and their use enables the utilization of a wide variety of special formulations of coating compositions which exploit the unique plasticizing properties of these materials—especially of rubber.

Many mercaptans and disulfides, previously known, but which may now be prepared more simply and economically by the processes of my invention, are chemical intermediates for the synthesis of sulfonic acids and sulfonium compounds which find extensive applications as wetting agents, detergents, emulsifiers and demulsifiers. Certain mercaptans, such as ethyl mercaptan, butyl mercaptan, and amyl mercaptan, and disulfides, such as furfuryl disulfide, are of considerable importance as odorants, the former as warning agents in gases and the latter as ingredients in perfumes. In the manufacture of particular types of glues and adhesives, certain vegetable proteins and albuminoids, such as soybean flour, linseed protein, etc., are treated with organic disulfides, such as methyl disulfide and butyl disulfide. Allyl disulfide and 2-methylallyl disulfide are valuable additives for imparting greater stability to films against the action of heat and ultra-violet light. The xanthates and dixanthogens are well known and have long been used as flotation agents. Other disulfides, such as dihexamethylenethiuram disulfide, dimorpholinethiuram disulfide, diphenyl disulfide, bis-(4-chlorophenyl) disulfide and beta-naphthyl disulfide, are of use as fungicides and insecticides. A number of disulfides, such as methyl disulfide and ethyl disulfide, are also used as additives in lubricating oils for improving the film strength and tenacity under high pressure, and as stabilizing agents in viscous, highly refined mineral oils, such as transformer oils.

In the category of organic disulfides which have hitherto been unknown and impossible to prepare by known methods but which may now be made according to the principles herein disclosed, are many compounds which I have found to possess properties valuable in industry and the arts. These compounds are useful in many of the applications enumerated above; in addition, particular compounds possess uniquely valuable characteristics.

Thus, for example, the new compound, methyl N, N-dimethylaminothioformyl disulfide, described in Example VIII, is a potent insecticide with very good "knock-down" properties. When this compound was tested on flies by the Peet-Grady large chamber method, a 2 per cent w./v. solution in refined kerosene gave a "knock-down" of 90 per cent in less than ten minutes and killed 84 per cent of the flies in twenty-four hours. The new, unsymmetrical compound, methyl n-butyl disulfide, described in Example II, combines the advantages of both the methylthiyl and the butylthiyl groups in one molecule, and will thus be found of greater value than either of the parent compounds in the manufacture of glue and adhesives. Methyl octyl disulfide, described in Example III, will be found useful as an odorant, fixative, and co-solvent in perfumes. It is also an excellent solvent for rubber, resins and plastics, and therefore of value in special coating composition formulations. Methyl beta-hydroxyethyl disulfide and ethyl 2-benzothiazyl disulfide, described in Examples V and VI, respectively, will be found useful as rubber chemicals of the type previously described.

From the foregoing discussion and examples it is evident that my invention provides not only simple and inexpensive processes for preparing a large number of known mercaptans and disulfides but also makes possible the synthesis of hitherto unknown disulfides, the composition of which can be "tailored" to provide unique and specially desired characteristics.

Typical practice of this invention, its simplicity, and wide utility will be illustrated by the following specific examples, which are not intended to limit the invention in any respect:

*Example I*

Reaction of a symmetrical organic disulfide with an excess of a mercaptan, in the presence of metallic sodium as a catalyst precursor, to form a different disulfide and mercaptan:

Methyl disulfide and n-butyl mercaptan were reacted to give n-butyl disulfide and methyl mercaptan as follows: Methyl disulfide (4.7 ml., 0.05 mol), n-butyl mercaptan (21 ml., 0.2 mol) and clean sodium (ca. 50 mg.) were placed in a 50 ml. flask connected by a ground glass joint to a reflux condenser, the outlet of which was connected to a trap cooled at —80° C. The mixture was heated at 125° C. for one hour. The excess n-butyl mercaptan was then distilled off at atmospheric pressure (B.P. 96° C.–100° C.), retaining the cold trap at the end of the system to condense the last traces of methyl mercaptan which might come over. The yield of methyl mercaptan (4.5 gm.) was 96 per cent of the theoretical. Upon distillation of the rest of the reaction mixture under reduced pressure, n-butyl disulfide, $b_{20}$116°–118° C., weighing 9.0 gm. (theoretical=8.9 gm.) was obtained.

Example II

Reaction of two symmetrical organic disulfides in the presence of sodium hyposulfide as catalyst precursor to produce a new unsymmetrical disulfide:

Methyl disulfide and n-butyl disulfide were reacted to form methyl n-butyl disulfide as follows: Methyl disulfide (10 ml.) and n-butyl disulfide (10 ml.) were placed in a 100 ml., 3-neck, round-bottom flask equipped with a sealed stirrer, reflux condenser, and a cork stopper. A solution of $Na_2S_2O_4$ (0.5 g. in 4 ml. of 10 per cent aqueous NaOH) and 5 ml. of ethyl alcohol (to improve contact) where now added. The mixture was stirred vigorously for 10 minutes at room temperature and for 2 hours at 80–90° C. The mixture was then cooled; water was added, and the organic phase separated with the aid of ether. The ethereal solution was washed with water, dried over anhydrous $MgSO_4$, filtered, and concentrated. Fractionation of the resultant mixture gave 9.0 g. of methyl n-butyl disulfide, $b_{22}$ 77.5–78.5° C.

Example III

Reaction of two symmetrical organic disulfides in the presence of sodium sulfide nonahydrate as catalyst precursor to produce a new unsymmetrical disulfide:

n-Octyl disulfide and methyl disulfide were reacted to give methyl n-octyl disulfide as follows: Methyl disulfide (13.5 ml., 0.15 mol), n-octyl disulfide (16.1 ml., 0.05 mol), and a solution of $Na_2S.9H_2O$ (ca. 50 mg.) in ethanol (ca. 2 ml.) were heated together at 80–90° C. for one hour. The mixture was then allowed to cool, was diluted slightly with ether, and was washed with water. After drying, filtering, concentrating, and fractionating the resultant organic phase, clear, water-white methyl n-octyl disulfide was obtained, boiling at 65–68° C. at 0.3 mm. pressure.

Example IV

Reaction of a symmetrical organic disulfide and a mercaptan in the presence of an aqueous solution of a sodium mercaptide (formed from the mercaptan and alkali) to produce a different disulfide and mercaptan:

Methyl disulfide and beta-mercaptoethanol were reacted to give bis-(beta-hydroxyethyl) disulfide as follows: Methyl disulfide (94.0 gm. 1.0 mol), beta-mercaptoethanol (234.0 gm., 3.0 mol.), and 100 ml. of 0.1 N sodium hydroxide solution (1 mol per cent, based upon the quantity of methyl disulfide), were placed in a 1 liter, two-neck, round bottom flask equipped with a sealed stirrer and a reflux condenser the top of which was connected to a trap cooled in $CO_2$-acetone. The reaction, which at 40–50° C. goes with extreme rapidity, was performed slowly so as to avoid too rapid liberation of a large volume of gas (methyl mercaptan). The mixture was stirred at room temperature for 45 minutes; during this period of time, methyl mercaptan was continuously evolved and collected, and the reaction mixture cooled appreciably. Heat was now applied gradually and after about five minutes the temperature rose to 25° C. At this point, the milky reaction mixture cleared to an homogeneous solution. Heating and stirring were continued for one hour (40 minutes to reach a slow reflux, then 20 minutes at this temperature). The apparatus was modified for distillation, and after neutralization with 0.8 ml. of concentrated hydrochloric acid, the water and excess beta-mercaptoethanol were distilled off with stirring in the vacuum of a water aspirator. The residue of bis-(beta-hydroxyethyl) disulfide containing sodium chloride was then distilled in vacuo through an 8" Vigreaux column, discarding a few ml. of low-boiling forerun (methyl beta-hydroxyethyl disulfide); the product, $b_{0.8-1.2}$ 141°–143° C., 146.2 gm. (94.9 per cent of the theoretical) obtained upon this single distillation was a clear, viscous, water-white and analytically pure liquid, solidifying slowly at slightly below room temperature, and melting at ca. 26°–28° C.

Example V

Reaction of two symmetrical organic disulfides in the presence of an aqueous solution of a sodium mercaptide (formed from the mercaptan and alkali) as catalyst, to produce a new unsymmetrical disulfide:

Methyl disulfide and bis-(beta-hydroxyethyl) disulfide were reacted to give methyl beta-hydroxyethyl disulfide as follows: The reaction mixture comprised the following: Methyl disulfide (28.2 gm., 0.3 mol), bis-(beta-hydroxyethyl) disulfide (23.1 gm., 0.15 mol), and an aqueous solution of beta-mercaptoethanol sodium mercaptide (made up from 85 ml. of distilled water, 15 ml. of 0.1 N sodium hydroxide solution, and 0.12 gm. of beta-mercaptoethanol, so as to give 100 ml. of solution containing 1 mol per cent of catalyst, based upon the quantity of bis-(beta-hydroxyethyl) disulfide used). This mixture was heated at 100° C. and stirred vigorously for 1¼ hours. Two phases were present at the start, as well as at the end of the experiment. After heating, the mixture was cooled and acidified slightly with 2 N sulfuric acid. The two layers were worked up separately. Upon concentration of the aqueous phase, only a negligible quantity of material remained; hence no attempt was made to recover methyl beta-hydroxyethyl disulfide or unreacted bis-(beta-hydroxyethyl) disulfide therefrom. Distillation of the organic layer gave unreacted and excess methyl disulfide in the first fraction ($b_{92}$ 50° C.), and methyl beta-hydroxyethyl disulfide ($b_{20}$ 112.5–113.5 C.) in the second fraction. The yield of the latter was 15.1 gm.

Example VI

Reaction of two symmetrical organic disulfides in the presence of sodium sulfide nonahydrate as catalyst precurser to produce a new unsymmetrical disulfide:

Ethyl disulfide and benzothiazyl disulfide were reacted to give ethyl benzothiazyl disulfide, as follows: Ethyl disulfide (73.2 gm., 0.6 mol), benzothiazyl disulfide (13.3 gm., 0.04 mol), and a solution of $Na_2S.9H_2O$ (ca. 50 mg.) in ethanol (ca. 1–2 ml.) were heated at 100° C. for four hours. The solution, after cooling, was washed with water and dried over anhydrous potassium carbonate. The excess ethyl disulfide was distilled off at 20 mm. pressure. The crude product was then distilled, $b_{.005}$ 115–117° C., giving almost pure ethyl benzothiazyl disulfide. It was obtained in analytical purity by redistillation.

Example VII

Reaction of two symmetrical organic disulfides in the presence of sodium methyl mercaptide to produce a new unsymmetrical disulfide:

Methyl disulfide and diisopropyl dixanthogen were reacted to give methyl isopropoxthioformyl disulfide as follows: To three mols of methyl disulfide (282 gm.) was added ca. 50 mg. of finely pulverized sodium sulfide nonahydrate dispersed in ca. 1 ml. of ethanol. The mixture was heated to 60° C. to hasten the formation of the catalyst, $CH_3SNa$, and to increase its solubility. Diisopropyl dixanthogen (40.5 gm., 0.15 mol) was now added, and the resulting solution was heated at 100° C. for two hours. The mixture was cooled, washed once with water, and dried over anhydrous potassium carbonate. The excess methyl disulfide was removed by distillation under reduced pressure ($b_{90}$ 50° C.), and the crude product distilled, $b_{0.2-0.3}$ 50°–52° C. The yield of product was 47.0 gm.

Example VIII

Reaction of two symmetrical organic disulfides in the presence of sodium sulfide nonahydrate as catalyst precursor to produce a new unsymmetrical disulfide:

Methyl disulfide and tetramethylthiuram disulfide were reacted to give methyl N,N-dimethylaminothioformyl disulfide as follows: Tetramethylthiuram disulfide (30.0 gm., 0.125 mol) was dissolved in methyl disulfide (120 gm., 1.25 mol) to which had been added ca. 75 mg. of finely pulverized sodium sulfide nonahydrate suspended in ca. 1.5 ml. of ethanol. The mixture was heated at 100° C. for 1½ hours. The excess methyl disulfide was now distilled off at reduced pressure, and the crude product was filtered. Distillation of the liquid, $b_{0.7}$ 104°–108° C., gave 29.3 gm. of pure methyl N,N-dimethylaminothioformyl disulfide.

Example IX

Reaction of an unsymmetrical organic disulfide in the presence of sodium sulfide nonahydrate as catalyst precursor to form two symmetrical disulfides:

Methyl n-butyl disulfide was subjected to redistribution reaction as follows: A quantity of methyl n-butyl disulfide was heated at 100° C. for two hours with a catalytic quantity of $Na_2S.9H_2O$ in ethanol. Reduced pressure fractionation of the resulting mixture gave methyl disulfide, methyl n-butyl disulfide, and n-butyl disulfide in a molar ratio of 1:2:1.

Other examples of various reactants, catalysts, processes, and reaction products are as follows:

Example X

Ethyl n-butyl disulfide, an unsymmetrical, di-aliphatic disulfide, may be prepared from n-butyl mercaptan and ethyl disulfide in a 1:1 molar ratio, by reacting these materials under conditions similar to those already described, in the presence of a catalyst precursor such as sodium sulfide or butyl lithium. Ethyl mercaptan is recovered as a by-product of this reaction.

Example XI

Ethyl 2-chloroethyl disulfide, an unsymmetrical, substituted, di-aliphatic disulfide, may be prepared from a mixture of the two symmetrical disulfides, ethyl disulfide, and bis-(2-chloroethyl) disulfide, under the conditions already outlined, in the presence of lithium ethyl mercaptide as catalyst, which may be prepared separately and added to the reaction mixture. The catalyst is prepared by mixing lithium metal and ethyl mercaptan in a few cc. of alcohol.

Example XII

Ethyl allyl disulfide, an unsymmetrical di-aliphatic disulfide may be prepared similarly by reacting ethyl disulfide and allyl mercaptan in a 1:1 molar ratio, in the presence of a catalyst comprising potassium allyl mercaptide, prepared separately by adding allyl mercaptan to a solution of a small amount of potassium metal in a few cc. of ethyl alcohol. Ethyl mercaptan is recovered as a by-product of this reaction.

Example XIII

Isopropyl cyclopentyl disulfide, an unsymmetrical, aliphatic alicyclic disulfide, may be prepared from a mixture of the two symmetrical compounds, isopropyl disulfide and cyclopentyl disulfide, under the conditions outlined above, in the presence of a catalyst precursor comprising lithium sulfide in a few cc. of ethyl alcohol.

Example XIV

Ethyl cyclohexyl disulfide, an unsymmetrical, aliphatic alicyclic disulfide, may be prepared from ethyl disulfide and cyclohexyl mercaptan in a 1:1 molar ratio, in the manner already described, by the use of very concentrated—say 50 per cent—aqueous potassium hydroxide as the catalyst precursor. Ethyl mercaptan is recovered as a by-product of this reaction.

Example XV

Allyl 4-chlorocyclohexyl disulfide, an unsymmetrical, substituted, aliphatic alicyclic disulfide, may be prepared from a mixture of the two symmetrical compounds, allyl disulfide and 4-chlorocyclohexyl disulfide, in the presence of sodium allyl mercaptide as catalyst. The catalyst may be prepared by adding allyl mercaptan to an alcohol solution of sodium metal. This solution is then added to the reaction mixture.

Example XVI 2-hydroxyethyl phenyl disulfide, a substituted, unsymmetrical, aliphatic aromatic disulfide, may be prepared from a mixture of the two symmetrical disulfides, bis-(2-hydroxyethyl) disulfide, and phenyl disulfide, in the manner already described, by using potassium phenyl mercaptide as catalyst. The catalyst is prepared by dissolving potassium metal in a mixture of a small amount of thiophenol and a few cc. of ethyl alcohol.

Example XVII 2-chloropropyl alpha-naphthyl disulfide, a substituted, unsymmetrical, aliphatic aromatic disulfide, may be prepared from a mixture of the two symmetrical disulfides, bis-(2-chloropropyl) disulfide and bis (alpha-naphthyl) disulfide, under the usual reaction conditions, by use of a small amount of lithium sulfide in a few cc. of ethyl alcohol as catalyst precursor.

Example XVIII

Methyl 4-chlorophenyl disulfide, an unsymmetrical, substituted aliphatic aromatic disulfide, may be prepared from a mixture of methyl disulfide and 4-chlorothiophenol in a 1:1 molar ratio, in the manner already described in detail above, by the use of the mercaptide of 4-chlorothiophenol as catalyst. The latter is prepared by dissolving a small amount of potassium metal in an alcoholic solution of a small amount of the thiophenol. Methyl mercaptan is recovered as a by-product of this reaction.

Example XIX

Ethyl 2-thienyl disulfide, an unsymmetrical, aliphatic heterocyclic disulfide, may be prepared from ethyl disulfide and 2-mercaptothiophene in a 1:1 molar ratio, under the conditions of reaction usually employed, by the use of potassium ethyl mercaptide as catalyst. The latter is prepared from ethyl mercaptan in ethyl alcohol solution by reaction with potassium metal.

Example XX

Methyl 2-pyridyl disulfide, an unsymmetrical, aliphatic heterocyclic disulfide, may be prepared from methyl disulfide and 2-mercaptopyridine by reacting these two materials in a 1:1 molar ratio, in the presence of dilute potassium hydroxide solution as catalyst precursor and reaction medium. The catalyst in this instance will comprise the potassium mercaptide of mercaptopyridine.

Example XXI

Allyl 4-(2-chloropyridyl) disulfide, an unsymmetrical, substituted, aliphatic heterocyclic disulfide, may be prepared in the usual manner from a mixture of the two symmetrical disulfides, allyl disulfide, and bis-[4-(2-chloropyridyl)] disulfide, in the presence of catalyst formed within the reaction mixture by adding potassium metal and a few cc. of methyl alcohol as the catalyst precursor.

Example XXII

Cyclopentyl cyclohexyl disulfide, an unsymmetrical, di-alicyclic disulfide, may be prepared in the manner already described from a mixture of the two symmetrical compounds, cyclopentyl disulfide and cyclohexyl disulfide, by reacting these in the presence of a catalyst precursor, such as, for example, lithium sulfide in a few cc. of ethyl alcohol.

Example XXIII 3-chlorocyclohexyl cyclohexyl disulfide, a substituted, unsymmetrical di-alicyclic disulfide, may be prepared from a mixture of the two symmetrical compounds bis-(3-chlorocyclohexyl) disulfide and cyclohexyl disulfide by interacting the two in the usual manner in the presence of catalyst formed from sodium sulfide in a few cc. of isopropyl alcohol as the catalyst precursor.

Example XXIV

Cyclopentyl cyclohexyl disulfide, an unsymmetrical, di-alicyclic disulfide, may be prepared from cyclopentyl disulfide and cyclohexyl mercaptan in a 1:1 molar ratio by interacting the two in the presence of sodium cyclopentyl mercaptide. The latter is prepared separately from cyclopentyl mercaptan and sodium metal in a few cc. of ethyl alcohol. Cyclopentyl mercaptan is recovered as a by-product in this reaction.

Example XXV

Cyclohexyl phenyl disulfide, an unsymmetrical, alicyclic aromatic disulfide, may be prepared in the usual manner from a mixture of the two symmetrical compounds, cyclohexyl disulfide and phenyl disulfide, by interacting these in the presence of sodium cyclohexyl mercaptide. The latter is prepared separately from cyclohexyl mercaptan in ethyl alcohol with sodium metal.

Example XXVI

Cyclohexyl beta-naphthyl disulfide, an unsymmetrical alicyclic aromatic disulfide, may be prepared by interacting the two symmetrical compounds, cyclohexyl disulfide and beta-napthyl disulfide, in the presence of a catalyst precursor. The catalyst precursor may be potassium sulfide or sodium sulfide or any other similar material already mentioned.

Example XXVII

Cyclopentyl 2-chlorophenyl disulfide, an unsymmetrical, substituted, alicyclic aromatic disulfide, may be prepared by interacting cyclopentyl disulfide and 2-chlorothiophenol in a 1:1 molar ratio in the presence of cyclopentyl sodium mercaptide as catalyst. The latter is prepared from cyclopentyl mercaptan in ethanol solution by the addition of sodium metal. Cyclopentyl mercaptan is recovered as a by-product of this reaction.

Example XXVIII

Cyclohexyl 4-pyridyl disulfide, an unsymmetrical, alicyclic heterocyclic disulfide, may be prepared in the usual manner from a mixture of the two symmetrical disulfides, cyclohexyl disulfide and bis-(4-pyridyl) disulfide by interacting these materials in the presence of the catalyst precursor comprising butyl lithium.

Example XXIX

Cyclopentyl 2-benzothiazyl disulfide, an unsymmetrical, alicyclic heterocyclic disulfide, may be prepared from a mixture of cyclopentyl disulfide and 2-mercaptobenzothiazol in the presence of the mercaptide of 2-mercaptobenzothiazol. The latter is prepared by reaction of 2-mercaptobenzothiazol with a solution of sodium metal in ethyl alcohol.

Example XXX 4-chlorocyclohexyl 2-thienyl disulfide, a substituted, unsymmetrical, alicyclic heterocyclic disulfide, may be prepared from a mixture of the two symmetrical compounds, bis - (4 - chlorocyclohexyl) disulfide and bis-(2-thienyl) disulfide by interacting these materials in the presence of a catalyst precursor comprising butyl potassium.

Example XXXI

Phenyl 2-thienyl disulfide, an unsymmetrical, aromatic heterocyclic disulfide, may be prepared by interacting in a 1:1 molar ratio, bis-(2-thienyl) disulfide and thiophenol in the presence of lithium phenyl mercaptide as catalyst. The latter is prepared from lithium metal and thiophenol in a few cc. of alcohol. 2-mercaptothiophene is recovered as a by-product of this reaction.

Example XXXII

Phenyl 4-pyridyl disulfide, an unsymmetrical, aromatic heterocyclic disulfide, may be prepared from a mixture of the two symmetrical compounds, phenyl disulfide and bis-(4-pyridyl) disulfide, by interacting these two materials under the usual reaction conditions in the presence of the catalyst precursor comprising potassium sulfide in a few cc. of ethyl alcohol.

Example XXXIII 4-nitrophenyl 2-thienyl disulfide, a substituted, unsymmetrical, aromatic heterocyclic disulfide, may be prepared by interacting the two symmetrical compounds, bis-(4-nitrophenyl) disulfide and bis-(2-thienyl) disulfide, under the usual reaction conditions in the presence of sodium 4-nitrophenyl mercaptide as catalyst. The latter is prepared by dissolving a small amount of 4-nitrothiophenol in an alcoholic solution of sodium ethylate.

Example XXXIV 2-thienyl 4-pyridyl disulfide, an unsymmetrical, di-heterocyclic disulfide, may be prepared from a 1:1 molar mixture of bis-(2-thienyl) disulfide and 4-mercaptopyridine by interacting these two materials in the presence of a dilute solution of sodium hydroxide as catalyst precursor and reaction medium. The catalyst formed in this instance will comprise the sodium mercaptide of the 4-mercaptopyridine. 2-mercaptothiophene is recovered as a by-product of this reaction.

Example XXXV 4-pyridyl 4-(2-chloropyridyl) disulfide, a substituted, unsymmetrical, di-heterocyclic disulfide, may be prepared by reacting under the usual conditions, a mixture of the two symmetrical compounds, bis-(4-pyridyl) disulfide and bis-[4-(2-chloropyridyl)] disulfide, in the presence of a catalyst precursor comprising lithium sulfide in a few cc. of ethyl alcohol.

Example XXXVI 2-thienyl 2-benzothiazyl disulfide, an unsymmetrical, di-heterocyclic disulfide, may likewise be prepared from a mixture of the two symmetrical materials, bis-(2-thienyl) disulfide and bis-(2-benzothiazyl) disulfide by interacting these two materials under the usual reaction conditions, in the presence of a catalyst comprising sodium 2-thienyl mercaptide. The latter is prepared separately and then added to the reaction mixture by dissolving a small amount of sodium metal in ethyl alcohol, and adding to this solution a small amount of 2-mercaptobenzothiazole.

Other examples of the preparation of symmetrical disulfides by interaction of two moles of a mercaptan with one mol of a symmetrical disulfide are as follows:

Example XXXVII

Phenyl disulfide, a symmetrical, aromatic disulfide, may be prepared by reacting under the usual conditions a mixture of two or more mols of thiophenol and one mol of isopropyl disulfide in the presence of sodium phenyl mercaptide as catalyst. The latter is prepared by adding a small quantity of thiophenol to a solution of sodium metal in a few cc. of ethyl alcohol. Isopropyl mercaptan is recovered as a by-product of this reaction.

Example XXXVIII

Beta-naphthyl disulfide, a symmetrical, aromatic disulfide, is prepared from beta-mercaptonaphthalene when two or more mols of this compound are interacted with one mol of ethyl disulfide in the presence of lithium ethyl mercaptide. The latter is prepared by dissolving lithium metal in a mixture of ethyl mercaptan and a few cc. of ethyl alcohol. Ethyl mercaptan is recovered as a by-product in this reaction.

Example XXXIX

Bis-(4-pyridyl) disulfide, a symmetrical, diheterocyclic disulfide, may likewise be prepared by interacting two mols of 4-mercaptopyridine with one mol of ethyl disulfide in the presence of the potassium mercaptide of 4-mercaptopyridine. The latter is prepared by interaction of a dilute solution of potassium hydroxide and 4-mercaptopyridine. The dilute, aqueous alkali serves both as catalyst precursor and as the reaction medium.

Other examples of the formation of symmetrical disulfides by reaction of an unsymmetrical organic disulfide with any of the above catalytic materials are as follows:

Example XL

The unsymmetrical, substituted, aliphatic aromatic disulfide, 2-hydroxyethyl phenyl disulfide, gives the symmetrical compounds bis-(2-hydroxyethyl) disulfide, and phenyl disulfide, when it is treated with a catalyst comprising the potassium mercaptide of 2-mercaptoethanol under the usual reaction conditions already described. The catalyst is prepared by interaction of an alcoholic solution of potassium ethylate with a small amount of mercaptoethanol.

Example XLI

The unsymmetrical, di-aliphatic disulfide, ethyl allyl disulfide, gives the two symmetrical compounds, ethyl disulfide and allyl disulfide, by treating it with a catalyst precursor, comprising potassium sulfide in a small amount of ethyl alcohol, under the usual reaction conditions.

Example XLII

The unsymmetrical, aliphatic alicyclic disulfide, isopropyl cyclopentyl disulfide, likewise gives the two symmetrical compounds, isopropyl disulfide and cyclopentyl disulfide, by treating it with a catalyst comprising isopropyl lithium mercaptide under the usual conditions of reaction. The catalyst is prepared by interacting a small amount of isopropyl mercaptan with a solution of lithium propoxide in propyl alcohol.

Any of the numerous, unsymmetrical disulfides mentioned above will react in a similar manner under similar reaction conditions to furnish an equilibrium mixture of the two symmetrical disulfides which correspond to the organo-thiyl groups of the unsymmetrical disulfide.

The foregoing description and examples are for illustration only and are not intended to limit the scope of the invention. Any departure therefrom which conforms to the spirit of the invention and comes within the scope of the appended claims is to be regarded as an embodiment of this invention.

I claim as my invention:

1. The method of synthesizing organic disulfides which comprises subjecting reactants selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products—to a redistribution of their organo-thiyl groups by reacting said reactants in the presence of a catalyst chosen from the group consisting of an alkali-metal mercaptide, and substances capable of producing alkali-metal mercaptide in said reaction mixture.

2. The method of synthesizing organic disulfides which comprises subjecting, at a temperature of from about 20° C. to about 225° C., reactants selected from the group consisting of (a) a mixture of organic disulfides, (b) a mixture of an organic disulfide and a mercaptan, and (c) an unsymmetrical organic disulfide—the organo-thiyl groups of said reactants being in combination different from that of the reaction products— to a redistribution of their organo-thiyl groups by reacting said reactants in the presence of a catalyst chosen from the group consisting of an alkali-metal mercaptide, and substances capable of producing alkali-metal mercaptide in said reaction mixture.

3. The method of synthesizing an unsymmetrical organic disulfide which comprises effecting the redistribution of the organo-thiyl groups within a mixture of organic disulfides—the organo-thiyl groups of said reactants being in combination different from that of the reaction products—by reacting said mixture in the presence of a catalyst chosen from the group consisting of an alkali-metal mercaptide, and substances capable of producing alkali-metal mercaptide in said reaction mixture.

4. The method of synthesizing an unsymmetrical organic disulfide, RSSR', which comprises effecting the redistribution of the organo-thiyl groups within a mixture of two symmetrical organic disulfides, RSSR, and R'SSR', wherein R and R' represent two different organic radicals, by reacting said mixture in the presence of a catalyst chosen from the group consisting of an alkali-metal mercaptide, and substances capable of producing alkali-metal mercaptide in said reaction mixture.

5. The method of synthesizing an unsymmetrical organic disulfide which comprises subjecting a mixture of an organic disulfide and a mercaptan—the organo-thiyl groups of said reactants being in combination different from that of the reaction products—to a redistribution of their organo-thiyl groups by reacting said mixture in the presence of a catalyst chosen from the group consisting of an alkali-metal mercaptide, and substances capable of producing alkali-metal mercaptide in said reaction mixture, and recovering the unsymmetrical organic disulfide and the mercaptan formed in the process.

6. The method of synthesizing an unsymmetrical organic disulfide which comprises subjecting a mixture of approximately molar equivalent quantities of a symmetrical organic disulfide, RSSR, and a mercaptan, R'SH, wherein R and R' represent two different organic radicals, to a redistribution of their organo-thiyl groups by reacting said mixture in the presence of a catalyst chosen from the group consisting of an alkali-metal mercaptide, and substances capable of producing alkali-metal mercaptide in said reaction mixture, and recovering the unsymmetrical organic disulfide and the mercaptan formed in the process.

7. The method of synthesizing a symmetrical organic disulfide which comprises subjecting a mixture of approximately one mol of an organic disulfide and at least two mols of a mercaptan—the organo-thiyl groups of said reactants being in combination different from that of the reaction products—to a redistribution of their organo-thiyl groups by reacting said mixture in the presence of a catalyst chosen from the group consisting of an alkali-metal mercaptide, and substances capable of producing alkali-metal mercaptide in said reaction mixture, and recovering the symmetrical organic disulfide and the mercaptan formed in the process.

8. The method of synthesizing a symmetrical organic disulfide, R'SSR', which comprises subjecting a mixture of approximately one mol of a symmetrical organic disulfide, RSSR, and at least two mols of a mercaptan, R'SH, wherein R and R' represent two different organic radicals, to a redistribution of their organo-thiyl groups by reacting said mixture in the presence of a catalyst chosen from the group consisting of an alkali-metal mercaptide, and substances capable of producing alkali-metal mercaptide in said reaction mixture, and recovering the symmetrical organic disulfide and the mercaptan formed in the process.

9. The method of synthesizing the symmetrical organic disulfides, RSSR, and R'SSR, which comprises subjecting an unsymmetrical organic disulfide, RSSR', wherein R and R' represent two different organic radicals, to a redistribution of its organo-thiyl groups by reacting said unsymmetrical organic disulfide in the presence of a catalyst chosen from the group consisting of an alkali-metal mercaptide, and substances capable of producing alkali-metal mercaptide in said reaction mixture.

MORTON KLEIMAN.

REFERENCES CITED

The following references are of record in the file of this patent:

UNITED STATES PATENTS

| Number | Name | Date |
| --- | --- | --- |
| 2,234,204 | Starkweather | Mar. 11, 1941 |
| 2,237,627 | Olin | Apr. 8, 1941 |
| 2,363,614 | Patrick | Nov. 28, 1944 |

FOREIGN PATENTS

| Number | Country | Date |
| --- | --- | --- |
| 348,682 | Great Britain | May 12, 1931 |

OTHER REFERENCES

Bersin et al.: Berichte, vol. 71, June 1938, pages 1015–1024.